(12) United States Patent
Rougas et al.

(10) Patent No.: US 8,401,216 B2
(45) Date of Patent: Mar. 19, 2013

(54) ACOUSTIC TRAVELING WAVE TUBE SYSTEM AND METHOD FOR FORMING AND PROPAGATING ACOUSTIC WAVES

(75) Inventors: John A. Rougas, Liverpool, NY (US); Pasquale Dinovo, Camillus, NY (US)

(73) Assignee: Saab Sensis Corporation, Wilmington, DE (US)

( * ) Notice: Subject to any disclaimer, the term of this patent is extended or adjusted under 35 U.S.C. 154(b) by 302 days.

(21) Appl. No.: 12/912,012

(22) Filed: Oct. 26, 2010

(65) Prior Publication Data

US 2011/0096950 A1    Apr. 28, 2011

Related U.S. Application Data (60) Provisional application No. 61/255,260, filed on Oct. 27, 2009.

(51) Int. Cl.
*H04R 1/20* (2006.01)

(52) U.S. Cl. ........ 381/338; 381/337; 381/339; 381/340; 381/341; 381/342; 381/350; 381/351; 381/387; 381/395; 381/103; 181/152; 181/175

(58) Field of Classification Search .................. 381/337, 381/338, 339, 340, 341, 342, 350, 351, 387, 381/395, 103; 181/152, 175, 177–197
See application file for complete search history.

(56) References Cited

U.S. PATENT DOCUMENTS

| | | |
|---|---|---|
| 2,277,525 A | 3/1942 | Mercurius |
| 2,711,514 A | 6/1955 | Rifles |
| 3,977,006 A | 8/1976 | Miersch |
| 4,176,731 A | 12/1979 | Sinclair |
| 4,501,934 A | 2/1985 | Wiener |
| 4,628,528 A | 12/1986 | Bose et al. |
| 4,685,532 A | 8/1987 | Gunness |
| 5,105,905 A | 4/1992 | Rice |
| 5,197,103 A | 3/1993 | Hayakawa |
| 5,357,063 A | 10/1994 | House et al. |
| 5,373,564 A | 12/1994 | Spear et al. |
| 5,740,259 A | 4/1998 | Dunn |
| 6,059,069 A | 5/2000 | Hughes, II |
| 6,314,740 B1 | 11/2001 | De Blok et al. |
| 6,363,157 B1 | 3/2002 | Chick |
| 6,658,862 B2 | 12/2003 | Swift et al. |
| 6,862,252 B1 | 3/2005 | Hickling |
| 7,426,280 B2 * | 9/2008 | Aylward ........................ 381/338 |

(Continued)

OTHER PUBLICATIONS

Xiang, Ning and Sabatier, James M. "Land mine detection measurements using acoustic-to-seismic coupling" Detection and Remediation Technologies for Mines nd Minelike Targets V, SPIE vol. 4038 (2000).

Hickey, Craig J. et al. "A method for detection of shallow buried objects" Annali di Geofisica, vol. 43, N. 6, Dec. 2000, p. 1225-1233.

(Continued)

*Primary Examiner* — Vivian Chin
*Assistant Examiner* — Paul Kim
(74) *Attorney, Agent, or Firm* — Burr & Brown (57) ABSTRACT

The present invention is an acoustic traveling wave tube system for propagating a directional acoustic wave comprising an acoustic traveling wave tube having a cylindrical shape with a load on one end of the tube, a plurality of excitation rings positioned around a circumference of the tube and spaced at predetermined intervals along a length of the tube and a microprocessor having a database containing a plurality of waveforms representative of acoustic signals. The microprocessor energizes one of the plurality of excitation rings to form an acoustic wave, sequentially energizes one or more of the remaining excitation rings along the length of the tube to amplify the acoustic wave as the acoustic wave travels along the length of the tube, and propagates the acoustic wave from an end of the tube opposite the load as a shaped directional acoustic wave.

23 Claims, 6 Drawing Sheets

U.S. PATENT DOCUMENTS

| | | |
|---|---|---|
| 7,565,948 B2 | 7/2009 | Parker et al. |
| 7,623,670 B2 | 11/2009 | Hoefler et al. |
| 2003/0188920 A1 | 10/2003 | Brawley, Jr. |
| 2004/0170287 A1 | 9/2004 | Biwa et al. |
| 2006/0120549 A1 | 6/2006 | Burghardt |
| 2009/0041280 A1 | 2/2009 | Dodd |
| 2009/0252363 A1 | 10/2009 | Ickler |
| 2009/0310808 A1 | 12/2009 | Button et al. |

OTHER PUBLICATIONS

Keizer, Will P.M.N. "APAS: An Advanced Phased-Array Simulator" IEEE Antennas and Propagation Magazine, vol. 52, No. 2, Apr. 2010, p. 40-56.

Xiao, Lin et al., "Flexible, Stretchable, Transparent Carbon Nanotube Thin Film Loudspeakers" American Chemical Society, Nano Letters, vol. 8, No. 12, 2008, p. 4539-4545.

* cited by examiner

ACOUSTIC TRAVELING WAVE TUBE SYSTEM AND METHOD FOR FORMING AND PROPAGATING ACOUSTIC WAVES

FIELD OF THE INVENTION

The present invention relates to a system and method for forming and propagating acoustic waves using a plurality of excitation rings positioned around a circumference of a cylindrical acoustic traveling wave tube system.

BACKGROUND OF THE INVENTION

Propagation of sound in a cylindrical waveguide (CWG) currently relies on mechanical movement of a piston or speaker cone along the axis of the CWG. Analysis of CWGs can be found in numerous sources including: Leo A. Beranek, "Acoustics," Acoustical Society of America, 1993; Frank Fahy, "Foundations of Engineering Acoustics," Elsevier Academic Press, 2007.

The use of a piston or speaker cone to convert electrical energy into acoustic energy is well known in the art. Pistons and speakers require a mechanical motion to displace a medium, such as air or water, to form an acoustic wave. However, the mechanical movement required of a piston or speaker cone to convert electrical energy into acoustic energy has several disadvantages including mechanical failure, lack of low frequency response and the sound pressure level loss in the propagated acoustic wave. Since the piston or speaker cone is a point source, amplification of the acoustic wave after an acoustic wave is propagated from the piston or speaker cone is difficult without very complex and expensive electronics.

What is needed is a system and method for generating acoustic waves in the infrasound, audible sound and ultrasound regions that can be amplified and propagated using a simple, but robust system.

SUMMARY OF THE INVENTION

According to a first aspect of the present invention, there is provided an acoustic traveling wave tube system for propagating a directional acoustic wave, the system comprising an acoustic traveling wave tube having a cylindrical shape with a load on one end of the tube and a plurality of excitation rings positioned around a circumference of the tube and spaced at predetermined intervals along a length of the tube. The system further comprises a power amplifier, an acoustic signal equalizer, a communications link, and a microprocessor having a database containing a plurality of waveforms representative of acoustic signals. The microprocessor energizes one of the plurality of excitation rings to form an acoustic wave, sequentially energizes one or more of the remaining excitation rings along the length of the tube to amplify the acoustic wave as the acoustic wave travels along the length of the tube, and propagates the acoustic wave from an end of the tube opposite the load as a shaped directional acoustic wave.

In some embodiments of the present invention, the acoustic traveling wave tube is formed of a lightweight rigid material selected from the group consisting of thermoplastics, thermoplastic laminates, structural composite materials, metals, ceramics, glass, wood and graphine. In some of these embodiments, the acoustic traveling wave tube is formed of a plurality of cascaded cylindrically-shaped tube sections that are mechanically joined or bonded to one another end-to-end while retaining the internal dimensions of the tube.

In some embodiments, the ratio of a circumference of the aperture of the acoustic traveling wave tube to a wavelength at the lowest frequency of the shaped directional acoustic wave to be propagated is at least 3 and a length of the acoustic traveling wave is a multiple of 4 times the axial spacing of the excitation rings for wideband non-resonant acoustic applications. In other embodiments for resonant acoustic applications, the ratio of a circumference of the aperture of the acoustic traveling wave tube to a wavelength at the lowest frequency of the shaped directional acoustic wave to be propagated is at least 3 and the length of the tube is:

$$L \approx c\left[\frac{2n-1}{4f_n}\right]$$

where c is the speed of sound in the tube,
$f_n$ is the natural resonant frequency of the tube (c/4L), and
n is an integer greater than zero.

In some embodiments, each of the plurality of excitation rings is an acoustic transducer of a piezoelectric/electrostrictive material. In some of these embodiments, the plurality of excitation rings are spaced at intervals of a maximum of one quarter acoustic wavelength of the highest frequency to be generated.

In some embodiments, the number of excitation rings and the order in which they are energized by the microprocessor along the length of the acoustic traveling wave tube determines the frequency of the directional acoustic wave. In these embodiments, the shaped directional acoustic wave is formed without any mechanical movements within the acoustic traveling wave tube.

In some embodiments, the system time phases the directional acoustic wave output by two or more acoustic traveling wave tubes to constructively beam steer the directional acoustic wave. In some of these embodiments, the time phasing includes quadrature differential time phasing.

According to a second aspect of the present invention, there is provided an acoustic traveling wave tube system for propagating a directional acoustic wave, the system comprising a sheet of carbon nanotube material, a plurality of excitation rings formed by lengths of carbon nanotube material at predetermined intervals on one surface, wherein the lengths of carbon nanotube material forming the plurality of excitation rings on one surface of a rigid cylindrically-shaped tube. The system further comprises a load on one end of the tube, a power amplifier, an acoustic signal equalizer, a communications link, and a microprocessor having a database containing a plurality of waveforms representative of acoustic signals. The microprocessor energizes one of the plurality of carbon nanotube excitation rings to form an acoustic wave, sequentially energizes one or more of the remaining excitation rings along the length of the tube to amplify the acoustic wave as the acoustic wave travels along the length of the tube, and propagates the acoustic wave from an end of the tube opposite the load as a shaped directional acoustic wave.

In some embodiments, the cylindrically-shaped acoustic traveling wave tube is formed of a lightweight rigid material selected from the group consisting of thermoplastics, thermoplastic laminates, structural composite materials, metals, wood and graphine.

In some embodiments, the ratio of a circumference of the aperture of the acoustic traveling wave tube to a wavelength at the lowest frequency of the shaped directional acoustic wave to be propagated is at least 3 and a length of the acoustic traveling wave is a multiple of 4 times the axial spacing of the excitation rings for wideband non-resonant acoustic applications. In other embodiments for resonant acoustic applications, the ratio of a circumference of the aperture of the acoustic traveling wave tube to a wavelength at the lowest frequency of the shaped directional acoustic wave to be propagated is at least 3 and the length of the tube is:

$$L \approx c\left[\frac{2n-1}{4f_n}\right]$$

where c is the speed of sound in the tube,
$f_n$ is the natural resonant frequency of the tube (c/4L), and
n is an integer greater than zero.

In some embodiments, each of the plurality of excitation rings of carbon nanotube material is mechanically integrated into the cylindrically-shaped tube.

In other embodiments, each of the plurality of excitation rings of carbon nanotube material is attached to an outer surface of a cylindrically-shaped tube.

In yet other embodiments, each of the plurality of excitation rings of carbon nanotube material is attached to an inner surface of a cylindrically-shaped tube. In some embodiments, the plurality of carbon nanotube excitation rings are formed at intervals of a maximum of one quarter acoustic wavelength of the highest frequency to be generated.

In some of these embodiments, the number of excitation rings and the order in which they are energized by the microprocessor along the length of the acoustic traveling wave tube determines the frequency of the directional acoustic wave. In these embodiments, the shaped directional acoustic wave is formed without any mechanical movements within the acoustic traveling wave tube.

In some embodiments, the system time phases the directional acoustic wave output by two or more acoustic traveling wave tubes to constructively beam steer the directional acoustic wave. In some of these embodiments, the time phasing includes quadrature differential time phasing.

According to a third aspect of the present invention, there is provided a method of propagating a directional acoustic wave, the method comprising energizing one of the plurality of excitation rings to generate an acoustic wave in a rigid cylindrically-shaped acoustic traveling wave tube, sequentially energizing one or more of the remaining excitation rings along the length of the tube using a microprocessor having a database containing a plurality of acoustic signals to amplify the acoustic wave as the acoustic wave travels along the length of the tube, and propagating the acoustic wave from an end of the tube opposite a load as a shaped directional acoustic wave.

In some embodiments, the method further comprises time phasing the shaped directional acoustic wave propagated by two or more acoustic traveling wave tubes to constructively beam steer the shaped directional acoustic wave. In some of these embodiments, the time phasing includes quadrature differential time phasing.

BRIEF DESCRIPTION OF THE DRAWINGS

For a fuller understanding of the nature and objects of the invention, reference should be made to the following detailed description of a preferred mode of practicing the invention, read in connection with the accompanying drawings in which.

DETAILED DESCRIPTION OF THE INVENTION

The acoustic traveling wave tube system of the present invention propagates a directional acoustic wave. The acoustic traveling wave tube system includes an acoustic traveling wave tube having a cylindrical shape, a load, to attenuate the propagation of acoustic energy in one direction, attached to one end of the acoustic traveling wave tube, and a plurality of excitation rings positioned around the circumference of the tube and spaced at predetermined intervals along the tube. The system further comprises a power amplifier, an acoustic signal equalizer, a communications link and a microprocessor control including at least a processor and memory containing a data base containing a plurality of waveforms representative of acoustic signals.

The present invention overcomes the physical limitations of a mechanical stimulus within an acoustic waveguide by applying pressure sources perpendicular to the acoustic waveguide axis via electronically driven transducer rings. A series of transducer rings spaced along the acoustic waveguide axis are used to shape the pressure wave within the acoustic waveguide when suitably excited. Since no mechanical movements are required within the acoustic waveguide, the present invention operates over a very wide frequency range. Also, the output sound pressure level of the present invention can be made larger than existing devices, possibly up to the atmospheric limited SPL of about 197 dB by adjusting the length of the device.

Figure 1:
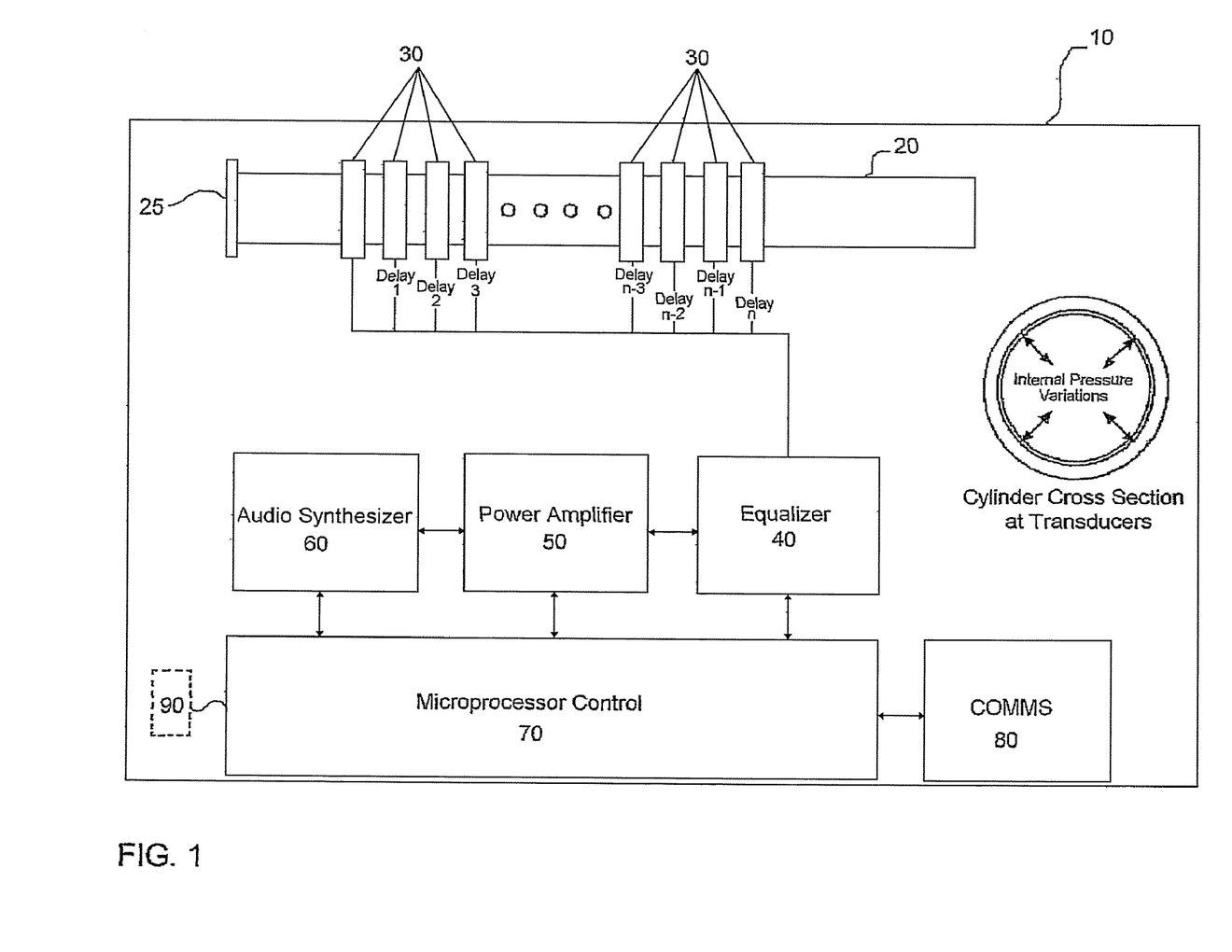
FIG. 1 depicts the configuration of one embodiment of the acoustic traveling wave tube system of the present invention.

In a first embodiment, shown in FIG. 1, the acoustic traveling wave tube system 10 includes acoustic traveling wave tube 20, with a matching load 25 on one end of acoustic traveling wave tube 20, and a plurality of excitation rings 30 spaced at intervals along the length of acoustic traveling wave tube 20. The plurality of excitation rings 30 are connected to acoustic equalizer 40, acoustic power amplifier 50 and audio synthesizer 60, which are controlled by microprocessor 70. Microprocessor control 70 includes a CPU, memory and interfaces with at least acoustic equalizer 40, acoustic power amplifier 50 and audio synthesizer 60 and communications link 80. Microprocessor control 70 receives commands via communications link 80 or a direct user interface 90, such as a mouse, keyboard and display. Each of the components forming the acoustic traveling wave tube system is discussed in more detail in the following paragraphs.

In some embodiments, the acoustic traveling wave tube 20 is formed of a light weight rigid material, such as thermoplastics, thermoplastic laminates, structural composite materials, metals, ceramics, glass, wood and graphine. In other embodiments, the acoustic traveling wave tube 20 is formed of a piezoelectric/electrostrictive material. In some embodiments, the acoustic traveling wave tube has a rectangular, square or elliptical shape. In a preferred embodiment, the acoustic traveling wave tube 20 is a tube having a cylindrical shape that is constant throughout the length of the tube.

The length and diameter of the acoustic traveling wave tube 20 are determined by common laws of physics and depend on whether the acoustic traveling wave tube system is being used in a wideband non-resonant acoustic application or resonant acoustic application.

For wideband non-resonant acoustic applications, the ratio of the circumference of the tube aperture to the acoustic wavelength having the lowest frequency to be propagated is at least 3, and the length of the acoustic traveling wave tube 20 is a multiple of four times the axial spacing of the excitation rings.

For resonant acoustic applications, the ratio of the circumference of the tube aperture to the acoustic wavelength at the resonant frequency is at least 3 and the length of the acoustic traveling wave tube is expressed by the following equation:

$$L \approx c\left[\frac{2n-1}{4f_n}\right]$$

where c is the speed of sound in the acoustic traveling wave tube, $f_n$ is the natural resonant frequency of the acoustic traveling wave tube 20 (c/4L), and n is an integer greater than zero.

Another factor in the length of the acoustic traveling wave tube 20 is the desired amplification of the acoustic signal. For example, if four excitation rings spaced at a distance of one-quarter wavelength of the acoustic signal create an acoustic wave with a power of 1×, to amplify the acoustic signal to ten times the power (10×), the tube will need to have a length equal to at least 40 excitation rings spaced at a distance of one-quarter wavelength to provide the desired amplification of the acoustic signal.

A load 25 is placed on one end of the acoustic traveling wave tube 20 to mitigate the propagation of acoustic energy in that direction, and thus enable the acoustic traveling wave tube to propagate the acoustic energy in a single direction. In one embodiment, the load 25 includes a solid end plate that encloses one end of the acoustic traveling wave tube, sound absorbing material and an electrical load that includes passive and conductive and resistive components. In another embodiment, the load 25 includes noise baffling material as well as the electronic components.

The plurality of excitation rings 30 are continuous conformal strips or rings of material capable of producing an acoustic signal in response to excitation received from the microprocessor. In one embodiment, the excitation rings 30 are acoustic transistors formed of piezoelectric/electrostrictive material. In another embodiment, the excitation rings 30 are formed of a carbon nanotube material. In some embodiments, the plurality of excitation rings 30 are integrated into the material of the acoustic traveling wave tube 20. In other embodiments, the plurality of excitation rings 30 are attached to the inner surface of the acoustic traveling wave tube 20 by an adhesive, for example. In yet other embodiments, the plurality of excitation rings 30 are attached to the outer surface of the acoustic traveling wave tube 20 by an adhesive, for example. Where the acoustic traveling wave tube 20 has a square, rectangular or elliptical shape, the excitation rings have a shape that conforms to the shape of the acoustic traveling wave tube 20 (i.e., conformal shape) to produce an acoustic wave and/or reinforce the acoustic wave traveling through the acoustic traveling wave tube 20.

The acoustic traveling wave tube system 10 also includes an acoustic signal power amplifier 50 that can amplify signals in the desired sound region. In one embodiment, the acoustic signal power amplifier 50 amplifies signals in the infrasound region, which is defined as 20 Hz and below. In another embodiment, the acoustic signal power amplifier 50 amplifies signals in the acoustic region, which is defined as acoustic waves having a frequency between 20 Hz and 20 KHz. In yet another embodiment, the acoustic signal power amplifier 50 amplifies signals in the ultrasound region, which is defined as an acoustic wave having a frequency greater than 20 KHz. In yet another embodiment, the acoustic signal power amplifier 50 amplifies signals in each of the infrasound, acoustic and ultrasound regions.

In one embodiment, the acoustic traveling wave tube system 10 includes an acoustic signal equalizer 40. In another embodiment, the functions of the acoustic signal power amplifier 50 and acoustic signal equalizer 40 are combined in a single unit.

The acoustic traveling wave tube system also includes a communications link 80. The communications link 80 can be hardwired telephonic link, an RF link, an electromagnetic link or a light link. In one embodiment, the communications link 80 is used to receive instructions on the type of acoustic signal the microprocessor 70 forms and propagates from the acoustic traveling wave tube system 10.

The acoustic traveling wave tube system 10 includes a microprocessor 70 that receives instruction through the communications link 80 or via a manual control panel 90 that controls the energization of one or more excitation rings along the length of the acoustic traveling wave tube 20 to form and propagate the desired acoustic wave. The microprocessor 70 has a 32-bit architecture with a minimum speed of 266 MHz. The microprocessor 70 accesses memory that contains a plurality of waveforms representative of the acoustic signals to be propagated from the acoustic traveling wave tube system as a shaped directional acoustic wave. The memory includes at least one of read only memory, random access memory, flash memory, disk memory and optical memory. The memory stores the operational program for the microprocessor 70 and at least a data base containing a plurality of waveforms representative of the acoustic signals to be propagated. In some embodiments, the microprocessor 70 also contains programming to receive and convert signals via the communications link 80.

Figure 2A:
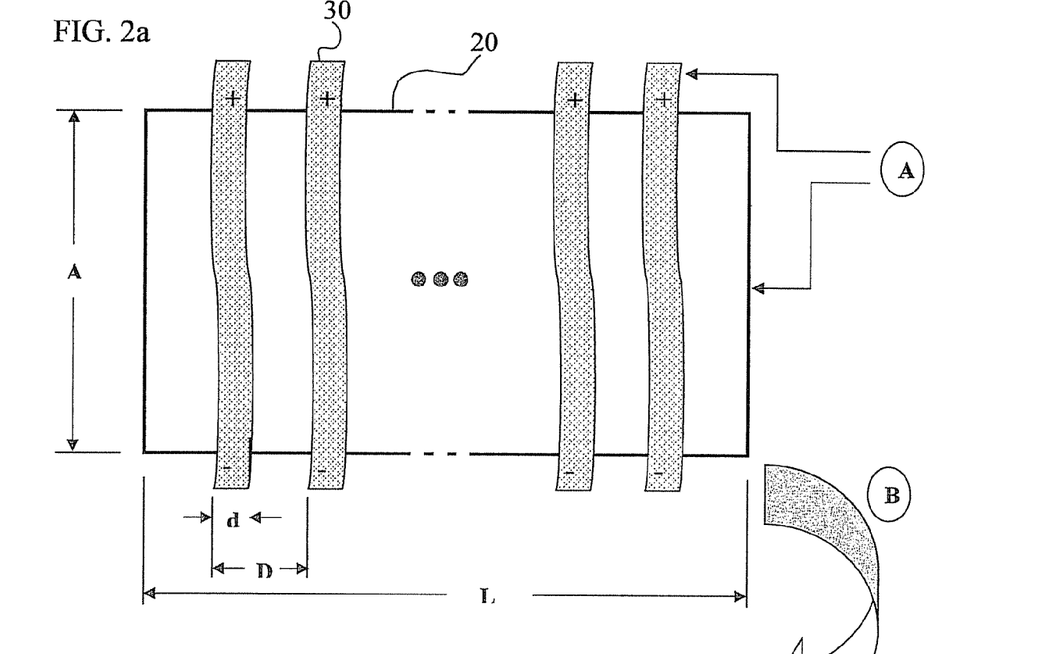
FIGS. 2a-2b illustrate another embodiment of the acoustic traveling wave tube of the present invention.

In a second embodiment, the acoustic traveling wave tube 20 is formed of one or more sheets of rigid material with the plurality of excitation rings 30 formed from strips of carbon nanotube material, as shown in FIG. 2(a). For example, in one embodiment the acoustic traveling wave tube 20 is formed by the following method:

Step A: The strips of carbon nanotube material are attached by an adhesive, for example, to the surface of the one or more sheets of rigid material, and are spaced from one another at a predetermined distance.

Figure 2B:
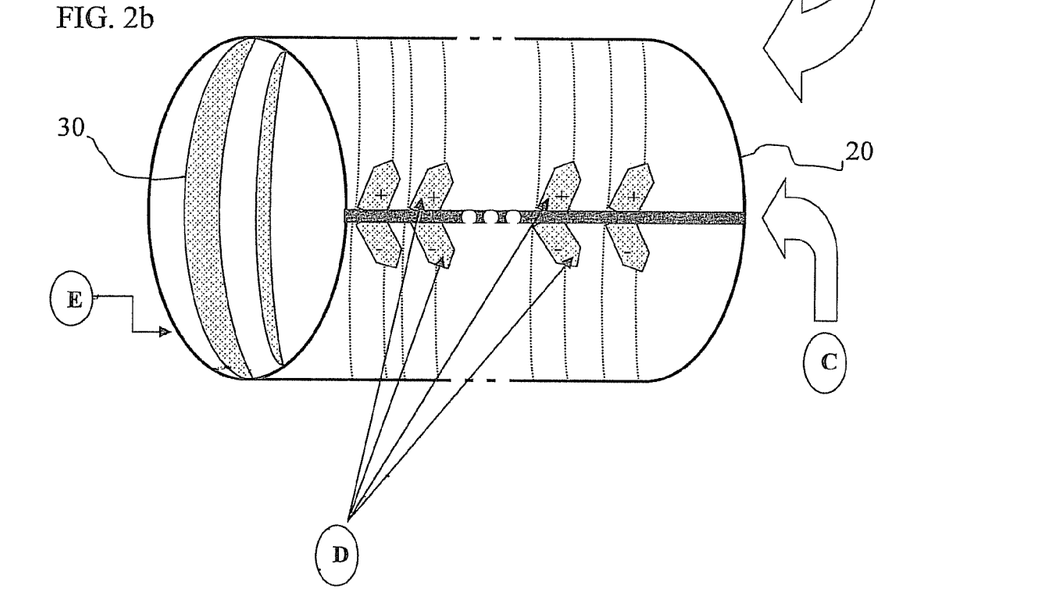

Step B: The one or more sheets of a rigid material having sufficient flexibility to be then formed into the acoustic traveling wave tube 20 having the desired length, as shown in FIG. 2(b).

Step C: The edges of the one or more sheets of rigid material are adhered together with an insulator adhesive to secure the longitudinal seam and the circumferential seams between the one or more sheets to form the acoustic traveling wave tube 20.

Step D: The strips of carbon nanotubes are connected to the equalizer 40 via tabs of carbon nanotube material that extend through the seam, as shown in FIG. 2(b).

In one embodiment of the acoustic traveling wave tube 20, the strips of carbon nanotube material are integrated into the one or more sheets of rigid material forming the acoustic traveling wave tube 20. In another embodiment of the acoustic traveling wave tube 20, the strips of carbon nanotube material are attached to the outer surface of the rigid material forming the acoustic traveling wave tube 20 by an adhesive, for example.

To propagate an acoustic wave from the acoustic traveling wave tube 20, the microprocessor 70 energizes one of the plurality of excitation rings 30 to create an acoustic wave at a predetermined frequency transverse to the length of the acoustic traveling wave tube 20. The present invention forms the acoustic wave without any mechanical motion to displace air in the acoustic traveling wave tube 20. The microprocessor 70 then sequentially energizes additional excitation rings of the plurality of excitation rings 30 with appropriate time delays to reinforce the acoustic wave as the acoustic wave travels along the length of the acoustic traveling wave tube 20. The number of excitation rings energized to propagate the acoustic wave is dependent on the predetermined frequency of the acoustic wave and the desired sound power level of the acoustic wave that is propagated from the acoustic traveling wave tube 20. The load 25 at the opposing end of the acoustic traveling wave tube 20 terminates the acoustic wave that initially travels in the opposite, unintended direction in the acoustic traveling wave tube 20.

First Application

Figure 3:
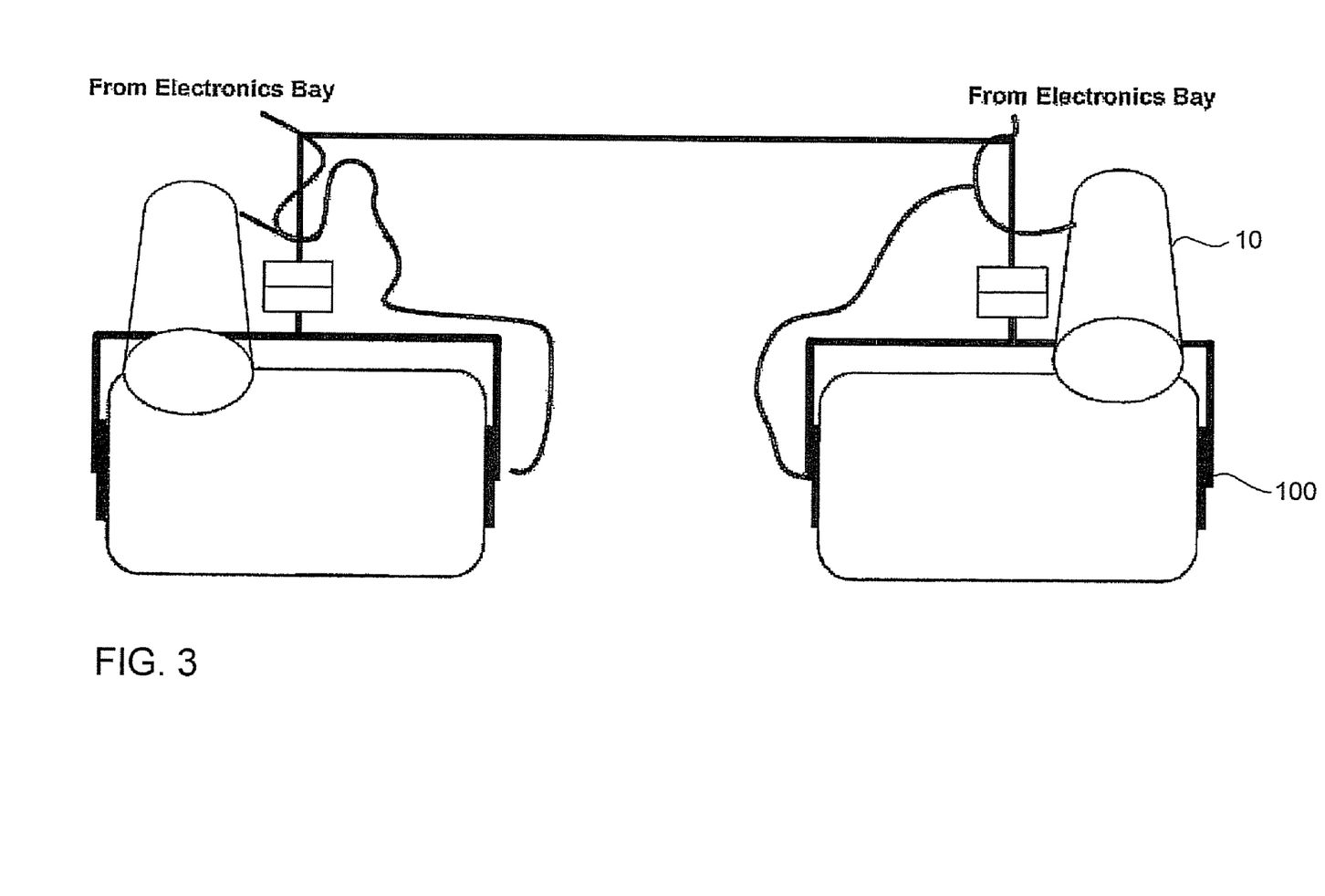
FIG. 3 depicts a first application of the acoustic traveling wave tube system of the present invention.

In a first application, the present invention uses a pair of high powered acoustic traveling wave tube systems 10 to augment acousto-seismic detection of buried objects, as shown in FIG. 3. In this application, acoustic signals in the range of 100 Hz to 300 Hz are transmitted directly at road surfaces by the acoustic traveling wave tube systems 10 in synchronism with a pair of couplant-filled bladders 100 in solid contact with the road surface. The pair of acoustic traveling wave tube systems 10 electronically scan synchronously with the pair of couplant-filled bladders 100 to establish range and bearing of buried objects in the roadway. This system can be augmented by a laser velocimiter (not shown).

In the embodiment shown in FIG. 3, the excitation system includes two acoustic traveling wave tube systems 10 of the present invention and two couplant-filled bladders 100 to efficiently launch both acoustic and seismic energy into the ground. Seismic energy generation is accomplished by a spatially separated pair of axially mounted couplant-filled bladders 100, which are similar to the rear wheels of a racing dragster, which contact the ground and provide a conformal coupling of seismic energy without the mechanical limitation of standard "thumpers." Low frequency energy is introduced independently to each couplant-filled bladder by means of axial mounted acoustic transducers (i.e., excitation rings 30) such that there is a close coupling between the excitation source and the fluid contained within the couplant-filled bladder without the limitations of mechanical inertia typical of "thumpers." The sides of each couplant-filled bladder 100 are physically restrained such that the low frequency energy introduced is launched into the ground at the point of surface contact defined by the couplant-filled bladder. By adaptively controlling the couplant-filled bladder contact area, additional degrees of freedom in area stimulation increase the probability of accurately detecting buried objects. The use of two spatially separated couplant-filled bladders 100 provides time-phase excitation to effectively beam steer the energy and sweep it in a scanning fashion across the interrogation path. This approach of using a couplant-filled bladder 100 conforming intimately to the terrain creates an efficient means of transferring seismic energy into the ground. Tailoring frequency content, whether random, fixed or swept will be easily delivered because the couplant-filled bladder 100 overcomes the mechanical limitations of a "thumper."

Two acoustic traveling wave tube systems are spatially separated and axially aligned with the couplant-filled bladders, as shown in FIG. 3. In one embodiment, each acoustic traveling wave tube system 10 produces a high sound pressure level (SPL) in the range of 50-1000 Hz together with an increased directivity of the output sound wave. The ability to time phase, including quadrature differential, the output energy from each independently excited acoustic traveling wave tube system 10 such that tension, compression and shear modes can be created as well as constructive or non-interference beam steering, are achieved. In the present invention, higher SPLs at the surface of the ground are achieved for a given amount of input acoustic energy because the acoustic traveling wave tube eliminates the mechanical limitations of piston or loudspeaker driven cylindrical waveguide. The acoustic traveling wave tubes can reproduce virtually any waveform including impulsive allowing for adaptively launching acoustic energy into higher density terrain, potentially including ice fields. In some embodiments of this application, the detection system utilizes Laser Doppler Vibrometers (LDVs) to derive primitive target detections across compression, stress and shear modes. To ensure low false alarm rates, Ground Penetrating Radars (GPRs) are utilized for further discrimination and validation of candidate signals. The present invention includes signal processing algorithms for each independent sensor suite that also combine signals from multiple acoustic traveling wave tube systems 10 to provide a synergistic benefit for detecting and validating targets.

Second Application

Figure 4:
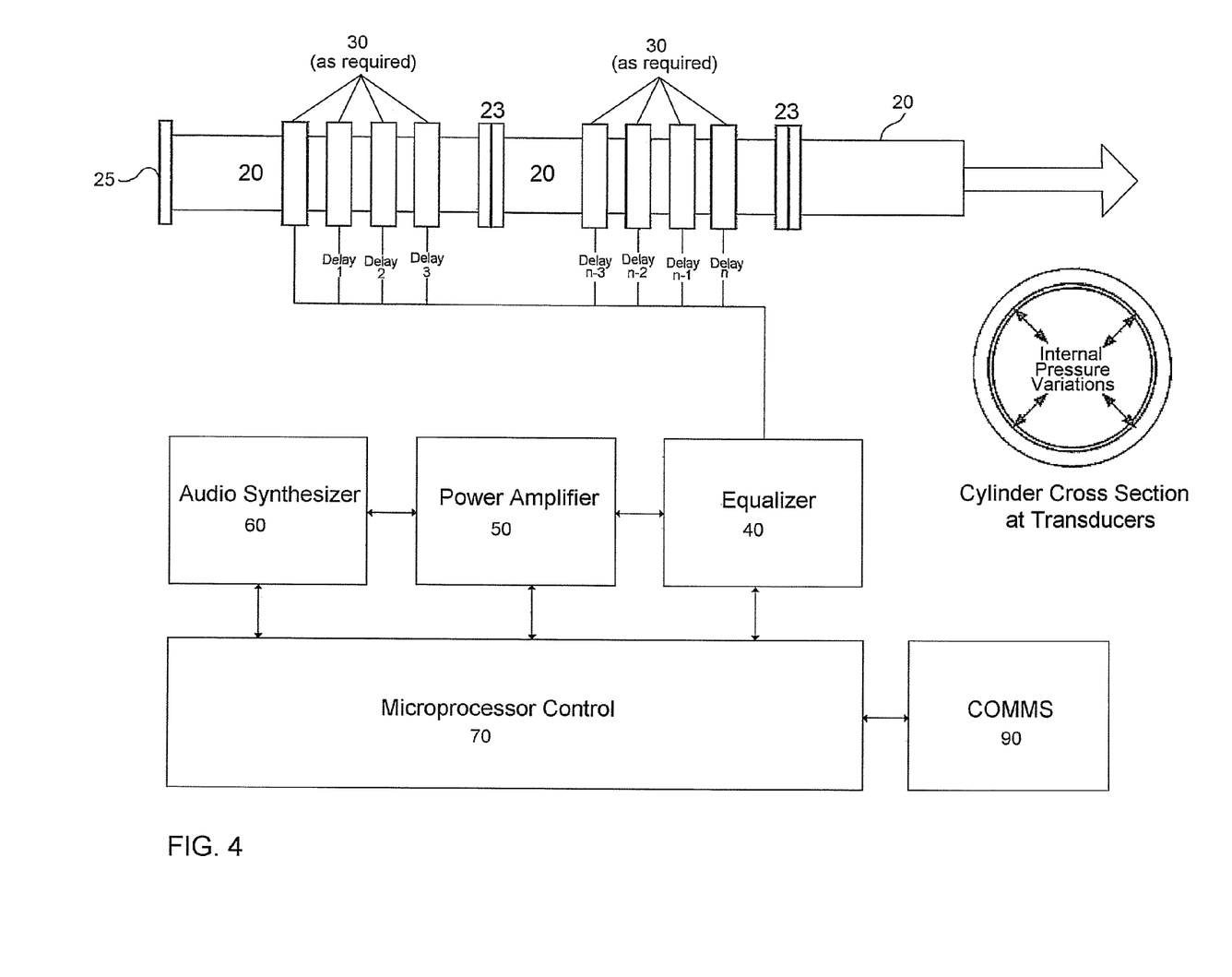
FIG. 4 depicts one configuration of the acoustic traveling wave tube system of the present invention used in a second application.

In a second application, one or more of the acoustic traveling wave tubes of the present invention are used to direct acoustic waves in the direction of remote terrestrial locations. For example, to propagate acoustic waves in the infrasound region, which is defined as acoustic waves of 20 Hz or less, the size of the acoustic traveling wave tube of the present invention is large (e.g., approximately 25 feet in length with an inner diameter of 16.93 inches) in the embodiment shown in FIG. 4. One embodiment of the acoustic traveling wave tube 20 for this application includes multiple sections of traveling wave tube that are joined together by clamps 23 to form the acoustic traveling wave tube, as shown in FIG. 4. This acoustic traveling wave tube 20 is similar to the acoustic traveling wave tube shown in FIG. 1, but enables the acoustic traveling wave tube to be physically transported to remote locations before being assembled.

Figure 5:
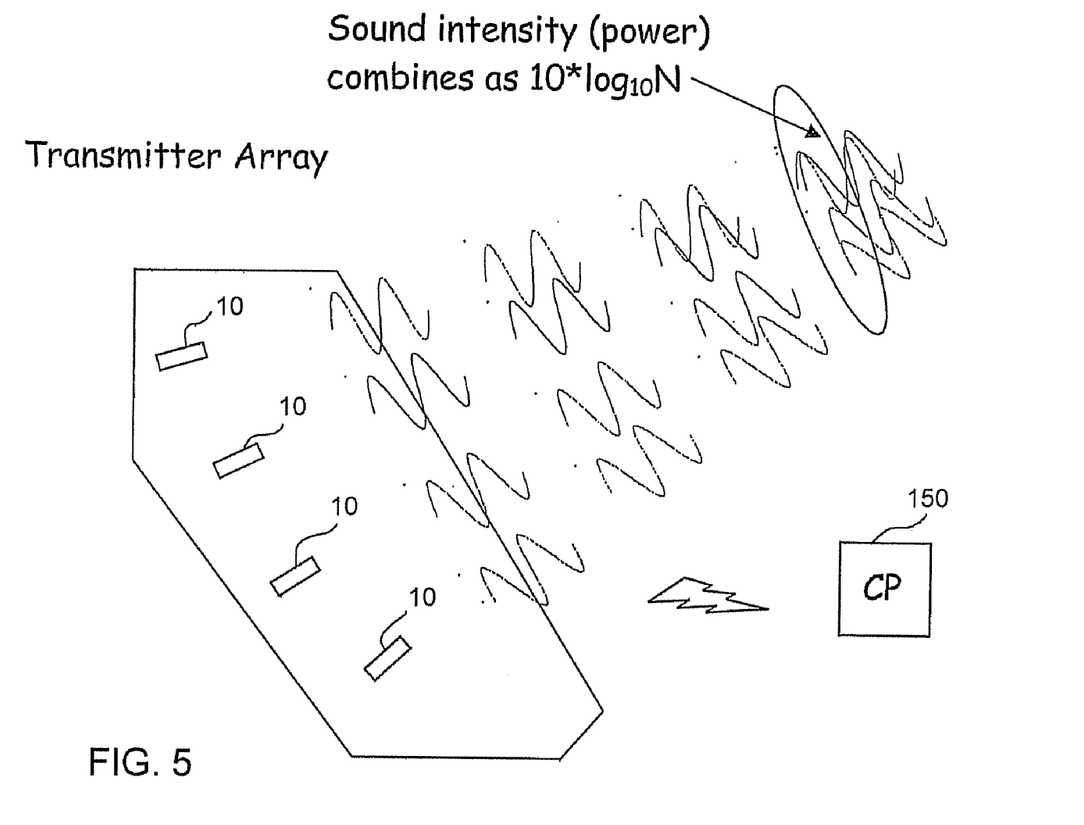
FIG. 5 illustrates a second application of the acoustic traveling wave tube system of the present invention.

In one embodiment for this application, shown in FIG. 5, four acoustic traveling wave tube systems 10 are used together with a single control processor, CP 150, to form an Infrasound Array Generated Offensive (IAGO). CP 150 coordinates the propagation of the infrasound acoustic waves output by the four acoustic traveling wave tube systems at a particular remote terrestrial location of interest.

Figure 6:
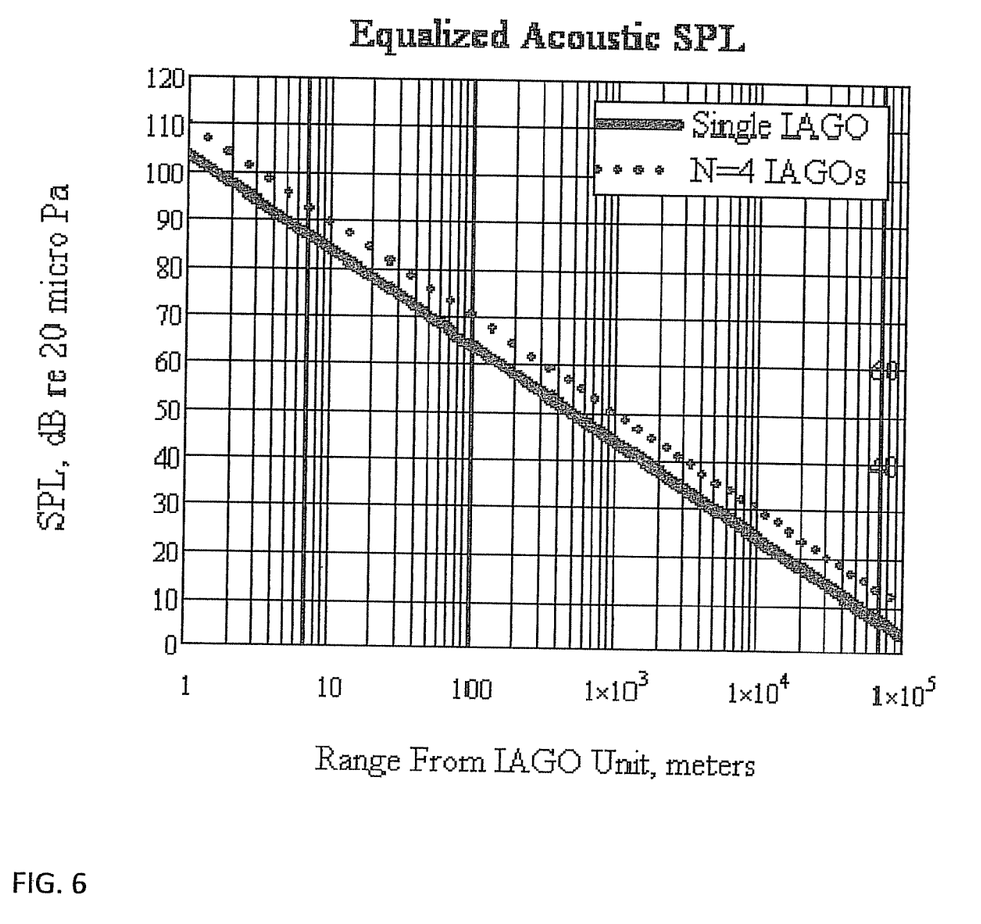
FIG. 6 shows the sound power level achieved by the coordinated output of four acoustic traveling wave tube systems directed at a remote terrestrial location.

Infrasound signals can propagate through the atmosphere for very long distances. For example, a sound power level of 50 dB can be propagated to a location 1000 meters from the four acoustic traveling wave tubes of IAGO, as shown in FIG. 6. The coordination of the output infrasound acoustic waves from the four acoustic traveling wave tube systems of IAGO combine to provide a sound intensity level of $10 \log_{10} N$ at the remote terrestrial location of interest, as shown in FIG. 5.

While the present invention has been particularly shown and described with reference to different applications and embodiments, as illustrated in the drawings, it will be understood by one skilled in the art that various changes in detail may be effected therein without departing from the spirit and scope of the invention as defined by the claims.

We claim:

1. An acoustic traveling wave tube system for propagating a directional acoustic wave, the system comprising:
    an acoustic traveling wave tube having a cylindrical shape with a load on one end of the tube;
    a plurality of excitation rings positioned around a circumference of the tube and spaced at predetermined intervals along a length of the tube;
    a power amplifier;
    an acoustic signal equalizer;
    a communications link; and
    a microprocessor having a database containing a plurality of waveforms representative of acoustic signals,
    wherein the microprocessor energizes one of the plurality of excitation rings to form an acoustic wave, sequentially energizes one or more of the remaining excitation rings along the length of the tube to amplify the acoustic wave as the acoustic wave travels along the length of the tube, and propagates the acoustic wave from an end of the tube opposite the load as a shaped directional acoustic wave.

2. The acoustic traveling wave tube system of claim 1, wherein the acoustic traveling wave tube is formed of a lightweight rigid material selected from the group consisting of thermoplastics, thermoplastic laminates, structural composite materials, metals, ceramics, glass, wood and graphine.

3. The acoustic traveling wave tube system of claim 1, wherein the acoustic traveling wave tube is formed of a plurality of cascaded cylindrically-shaped tube sections that are mechanically joined or bonded to one another end-to-end while retaining the internal dimensions of the tube.

4. The acoustic traveling wave tube system of claim 1, wherein, for wideband non-resonant acoustic applications, the ratio of a circumference of the aperture of the acoustic traveling wave tube to a wavelength at the lowest frequency of the shaped directional acoustic wave to be propagated is at least 3 and a length of the acoustic traveling wave is a multiple of 4 times the axial spacing of the excitation rings.

5. The acoustic traveling wave tube system of claim 1, wherein, for resonant acoustic applications, the ratio of a circumference of the aperture of the acoustic traveling wave tube to a wavelength at the lowest frequency of the shaped directional acoustic wave to be propagated is at least 3 and the length of the tube is:

$$L \approx c\left[\frac{2n-1}{4f_n}\right]$$

where
    c is the speed of sound in the tube,
    $f_n$ is the natural resonant frequency of the tube (c/4L), and
    n is an integer greater than zero.

6. The acoustic traveling wave tube system of claim 1, wherein each of the plurality of excitation rings is an acoustic transducer of a piezoelectric/electrostrictive material.

7. The acoustic traveling wave tube system of claim 6, wherein the plurality of excitation rings are spaced at intervals of a maximum of one quarter acoustic wavelength of the highest frequency to be generated.

8. The acoustic traveling wave tube system of claim 1, wherein the number of excitation rings and the order in which they are energized by the microprocessor along the length of the acoustic traveling wave tube determines the frequency of the directional acoustic wave.

9. The acoustic traveling wave tube system of claim 1, wherein the shaped directional acoustic wave is formed without any mechanical movements within the acoustic traveling wave tube.

10. The acoustic traveling wave tube system of claim 1, wherein the system time phases the directional acoustic wave output by two or more acoustic traveling wave tubes to constructively beam steer the directional acoustic wave.

11. The method of claim 10, wherein the time phasing includes quadrature differential time phasing.

12. An acoustic traveling wave tube system for propagating a directional acoustic wave, the system comprising:
    a sheet of carbon nanotube material;
    a plurality of excitation rings formed by lengths of carbon nanotube material at predetermined intervals on one surface, wherein the lengths of carbon nanotube material forming the plurality of excitation rings on one surface of a cylindrically-shaped tube;
    a load on one end of the tube;
    a power amplifier;
    an acoustic signal equalizer;
    a communications link; and
    a microprocessor having a database containing a plurality of waveforms representative of acoustic signals,
    wherein the microprocessor energizes one of the plurality of carbon nanotube excitation rings to form an acoustic wave, sequentially energizes one or more of the remaining excitation rings along the length of the tube to amplify the acoustic wave as the acoustic wave travels along the length of the tube, and propagates the acoustic wave from an end of the tube opposite the load as a shaped directional acoustic wave.

13. The acoustic traveling wave tube system of claim 12, wherein the cylindrically-shaped acoustic traveling wave tube is formed of a lightweight rigid material selected from the group consisting of thermoplastics, thermoplastic laminates, structural composite materials, metals, wood and graphine.

14. The acoustic traveling wave tube system of claim 12, wherein, for wideband non-resonant acoustic applications, the ratio of a circumference of the aperture of the acoustic traveling wave tube to a wavelength at the lowest frequency of the shaped directional acoustic wave to be propagated is at least 3 and a length of the acoustic traveling wave is a multiple of 4 times the axial spacing of the excitation rings.

15. The acoustic traveling wave tube system of claim 12, wherein, for resonant acoustic applications, the ratio of a circumference of the aperture of the acoustic traveling wave tube to a wavelength at the lowest frequency of the shaped directional acoustic wave to be propagated is at least 3 and the length of the tube is:

$$L \approx c\left[\frac{2n-1}{4f_n}\right]$$

where
    c is the speed of sound in the tube,
    $f_n$ is the natural resonant frequency of the tube (c/4L), and
    n is an integer greater than zero.

16. The acoustic travelling wave tube system of claim 12, wherein each of the plurality of excitation rings of carbon nanotube material is mechanically integrated into the cylindrically-shaped tube.

17. The acoustic traveling wave tube system of claim 12, wherein each of the plurality of excitation rings of carbon nanotube material is attached to an outer surface of a cylindrically-shaped tube.

18. The acoustic traveling wave tube system of claim 12, wherein each of the plurality of excitation rings of carbon nanotube material is attached to an inner surface of a cylindrically-shaped tube.

19. The acoustic traveling wave tube system of claim 12, wherein the plurality of carbon nanotube excitation rings are formed at intervals of a maximum of one quarter acoustic wavelength of the highest frequency to be generated.

20. The acoustic traveling wave tube system of claim 12, wherein the number of excitation rings and the order in which they are energized by the microprocessor along the length of the acoustic traveling wave tube determines the frequency of the directional acoustic wave.

21. The acoustic traveling wave tube system of claim 12, wherein the shaped directional acoustic wave is formed without any mechanical movements within the acoustic traveling wave tube.

22. The acoustic traveling wave tube system of claim 12, wherein the system time phases the directional acoustic wave output by two or more acoustic traveling wave tubes to constructively beam steer the directional acoustic wave.

23. The method of claim 22, wherein the time phasing includes quadrature differential time phasing.

* * * * *

UNITED STATES PATENT AND TRADEMARK OFFICE
CERTIFICATE OF CORRECTION

PATENT NO. : 8,401,216 B2  
APPLICATION NO. : 12/912012  
DATED : March 19, 2013  
INVENTOR(S) : John A. Rougas and Pasquale Dinovo Page 1 of 1

It is certified that error appears in the above-identified patent and that said Letters Patent is hereby corrected as shown below:

Please correct the following on the Title Page
Item (56) U.S. Patent Documents: Please change "2,711,514 A 6/1955 Rifles" to
-- 2,711,514 A 6/1955 Rines --

In the Claims:

Column 9, line 57
(claim 5, line 14): Please change "f" to -- $f_n$ --

Signed and Sealed this
Twenty-eighth Day of May, 2013

Teresa Stanek Rea
*Acting Director of the United States Patent and Trademark Office*